US011235650B2

(12) United States Patent
Gu et al.

(10) Patent No.: US 11,235,650 B2
(45) Date of Patent: Feb. 1, 2022

(54) STEADY BED COVER OF PICKUP TRUCK

(71) Applicant: NINGBO KUATU ELECTRONIC TECH. CO. LTD., Ningbo (CN)

(72) Inventors: Guanqian Gu, Ningbo (CN); Yunyan He, Ningbo (CN); Jianping Luo, Ningbo (CN)

( * ) Notice: Subject to any disclaimer, the term of this patent is extended or adjusted under 35 U.S.C. 154(b) by 0 days.

(21) Appl. No.: 16/852,431

(22) Filed: Apr. 18, 2020

(65) Prior Publication Data
US 2021/0291633 A1    Sep. 23, 2021

(51) Int. Cl.
*B60J 7/14*    (2006.01)
*B60P 7/02*    (2006.01)

(52) U.S. Cl.
CPC ............... *B60J 7/141* (2013.01); *B60P 7/02* (2013.01)

(58) Field of Classification Search
CPC ....... B60J 7/08; B60J 7/106; B60J 7/14; B60J 7/141; B60J 7/1607
USPC ............. 296/100.01, 100.06, 100.08, 100.09
See application file for complete search history.

(56) References Cited

U.S. PATENT DOCUMENTS

| 7,484,788 | B2 * | 2/2009 | Calder | B60J 7/141 |
| | | | | 296/100.01 |
| 9,421,851 | B2 * | 8/2016 | Kerr, III | B60J 7/198 |
| 9,482,039 | B1 * | 11/2016 | Xu | B60P 7/04 |
| 9,555,735 | B2 * | 1/2017 | Kerr, III | B60J 7/141 |
| 10,471,814 | B1 * | 11/2019 | Weng | B60J 7/141 |
| 2015/0054300 | A1 * | 2/2015 | Shi | B60R 11/00 |
| | | | | 296/100.09 |

FOREIGN PATENT DOCUMENTS

| DE | 202018105685 U1 * | 10/2018 | .............. | B60J 7/198 |
| JP | 04325315 A * | 11/1992 | | |
| JP | 06255371 A * | 9/1994 | | |

* cited by examiner

*Primary Examiner* — Jason S Daniels
(74) *Attorney, Agent, or Firm* — W&KIP (57) ABSTRACT

This invention is relevant to a steady bed cover of pickup truck. The bed cover includes at least two plates. The adjacent plates are connected by rotating shaft structure. This invention provides a steady bed cover of pickup truck with simple structure and great leading function. The connecting strength of rotating shaft structure is enhanced with the cooperation of the ladder-like hook and strip convex. When the bed cover of pickup truck is laid horizontally, the rotating part and the rotating shaft part are subjected to reverse force and are mutually matched, thus enhancing the stability of the bed cover.

10 Claims, 8 Drawing Sheets

STEADY BED COVER OF PICKUP TRUCK

CROSS-REFERENCE TO RELATED APPLICATIONS

This application claims priority to Chinese Patent Application No. 202010209647.0 with a filing date of Mar. 23, 2020. The content of the aforementioned application, including any intervening amendments thereto, are incorporated herein by reference.

TECHNICAL FIELD

This invention is relevant to mechanical field, especially about the bed cover of pickup truck.

BACKGROUND TECHNOLOGY

Pickup truck is a car with cab and an open truck compartment. With its comfortable interior environment, charming appearance, strong power, low price and the practicability of both passenger-cargo purpose, pickup truck meets the need of people from all walks of life. However, pickup trucks have open bed and often need a cover for shelter to prevent the goods in it from sunshine and rain. For example, the U.S. Pat. No. 7,484,788 B2 discloses a bed cover of pickup truck whose disadvantage is that water will seep into the inside of the rotating shaft in the transfer part. Thus it will result in the need for additional waterproof strips in the transfer part. The installation of waterproof strips is complex and the stability is poor. When water seeps into the inside of the rotating shaft, all the water in the rotating shaft can not be leaked due to the position of the outlet hole on the socket. And the installation hole on the socket destroys the overall aesthetics of the bed cover.

ABOUT THE INVENTION

The purpose of the invention is to provide a kind of steady pickup truck bed cover and solve at least one technical problem above.

Thus the invention comprises the following contents:

A steady bed cover of pickup truck includes one bed cover, wherein said the bed cover includes at least two plates. The adjacent plates are connected by rotating shaft structure;

The rotating shaft structure includes a pedestal, two rotating rods which are respectively arranged on two sides of the pedestal;

the pedestal includes a base and there is a rotating part on both sides of the base. And there is a rotary groove whose cross section is major arc shape on the rotary part. The straight rod arranged transversely is arranged above the rotary groove. The straight rod includes the upper part and the lower part. The cross sections of the upper part and the lower part are semi-circular. The radius of the upper part is larger than that the lower part, thus a ladder-like hook is formed on one side of the straight rod close to the base;

the rotating rod comprises a fixed part which is fixedly connected with the plate. One side of the fixed part is provided with a hook-like rotating shaft part. The rotating shaft part is inserted into the rotary groove and the front side of the rotating shaft part is provided with a strip convex for clamping the ladder-like hook.

The straight rod is solid. The upper part and the lower part of the straight rod adopt an integrated structure.

The rotating part is provided with a connecting plate which is obliquely arranged. One side of the connecting plate is connected with the rotating part, and the other side of the connecting plate is connected with the straight rod;

one side of the fixed part is provided with a reinforcing plate which is obliquely arranged. One side of the reinforcing plate is connected with the fixed part, and the other side of the plate is connected with the rotating shaft part.

The bed cover includes a side component which includes a sidebar, an intermediate rod socket and a shaft socket. The side bar is arranged on the outside of the plate and covers the side of the plate;

the rotating shaft socket covers the side of the base, and the intermediate rod joint covers the side of the fixed part;

the intermediate rod socket is provided with a convex part, and the lower surface of the convex part is an arc shape. The rotating shaft socket is provided with a groove part for inserting the convex part, and the groove is formed between the convex part and the groove part. The rotary groove is connected with the groove. A water outlet is arranged at the bottom of the groove.

The fixed part is provided with a first embedded slot, the side bar is provided with a second embedded slot. The intermediate rod socket is provided with a first clamping part and a second clamping part. The first clamping part is inserted into the first embedded slot, and the second clamping part is inserted into the second embedded slot; the intermediate rod socket and the side bar are both provided with a first bolt hole.

The base is provided with a third embedded slot, the rotating shaft socket is provided with a third clamping part and the third clamping part is inserted into the third embedded slot; a second bolt hole is arranged on the rotating shaft socket and the base.

The lower part of the plate body is provided with a long strip-shaped straight slot. A locking device for fixing the cargo box cover to the pickup truck body is arranged on the inner sides of the straight slot. The middle part of the straight slot is provided with an opening, which can be used as a maintenance opening.

The straight slot is provided with a lighting module.

In this design, the base and the rotating rod are matched to rotate. The base is provided with a rotating part and the rotating rod is provided with a rotating shaft part matched with the rotating part; Similarly, a rotating part is arranged on the rotating rod, and a rotating shaft part matched with the rotating part is arranged on the pedestal. That is to say, a steady bed cover of pickup truck includes one bed cover, wherein said the bed cover includes at least two plates. The adjacent plates are connected by rotating shaft structure;

the rotating shaft structure includes a pedestal, two rotating rods which are respectively arranged on two sides of the pedestal;

the rotating rod comprises a fixed part which is fixedly connected with the plate. There is a rotary groove whose cross section is major arc shape on the rotating part. The straight rod arranged transversely is arranged above the rotary groove. The straight rod includes the upper part and the lower part. The cross sections of the upper part and the lower part are semi-circular. The radius of the upper part is larger than that the lower part, thus a ladder-like hook is formed on one side of the straight rod close to the fixed part;

the pedestal includes a base and there is a hook-like rotating shaft part on both sides of the base. The rotating shaft part is inserted into the rotary groove and the front side of the rotating shaft part is provided with a strip convex for clamping the ladder-like hook.

This invention provides a steady bed cover of pickup truck with simple structure and great leading function. When the bed cover is in use and the water falls to the cover, it will penetrate into the rotary groove. Then the water will be discharged to both ends of the rotary groove so that it won't seep into the rotating shaft. The connecting strength of rotating shaft structure is enhanced with the cooperation of the ladder-like hook and strip convex. When the bed cover of pickup truck is laid horizontally, the rotating part and the rotating shaft part are subjected to reverse force and are mutually matched and blocked to prevent the pedestal and the rotating rod from separating, thus enhancing the stability of the bed cover.

THE CONCRETE METHOD TO CARRY OUT

The following instruction is to further explain the concrete implementation method of the invention with drawings.

According to FIGS. 1-8, a steady bed cover of pickup truck includes one bed cover which includes at least two plates 1. The adjacent plates are connected by rotating shaft structure. The rotating shaft structure includes a pedestal 6, two rotating rods 7 which are respectively arranged on two sides of the pedestal; the pedestal includes a base 11 and there is a rotating part 12 on both sides of the base. There is a rotary groove 9 whose cross section is major arc shape on the rotary part. The straight rod 14 arranged transversely is arranged above the rotary groove. The straight rod includes the upper part and the lower part. The cross sections of the upper part and the lower part are semi-circular. The radius of the upper part is larger than that the lower part, thus a ladder-like hook 15 is formed on one side of the straight rod close to the base; the rotating rod comprises a fixed part 16 which is fixedly connected with the plate. One side of the fixed part is provided with a hook-like rotating shaft part 17. The rotating shaft part is inserted into the rotary groove and the front side of the rotating shaft part is provided with a strip convex for clamping the ladder-like hook 19. This invention provides a steady bed cover of pickup truck with simple structure and great leading function. When the bed cover is in use and the water falls to the cover, it will penetrate into the rotary groove. Then the water will be discharged to both ends of the rotary groove so that it won't seep into the rotating shaft. Because of the different radius between the upper part and the lower part of the straight rod, a ladder-like hook is formed at the socket. The connection strength of the rotating shaft structure is increased by the cooperation of the rotating part and the rotating shaft part with the strip convex through the ladder-like hook, When the bed cover of pickup truck is laid horizontally, the rotating part and the rotating shaft part are subjected to reverse force and are mutually matched and blocked to prevent the pedestal and the rotating rod from separating, thus enhancing the stability of the bed cover. According to this design, the angle between 86° and 180° can be formed when the two adjacent plates on the cargo box cover are turned over. Thus the car cover can be folded and tiled, and the drainage channel formed by the rotary groove is larger, which is conducive to drainage.

There are three or four plates. The number of plates can be changed according to the transportation needs so that the user can take out the transportation materials from the bed cover of pickup truck. In order to save cost, the pedestal adopts hollow structure and is separated from the rotary groove.

The straight rod is solid. The upper part and the lower part of the straight rod adopt an integrated structure. The strength of the solid straight rod is higher, and the rotation radius of the shaft part around the solid straight rod is reduced, therefore making it more stable. The outer side of the shaft part is is leveled to ensure the flatness.

Figure 1:
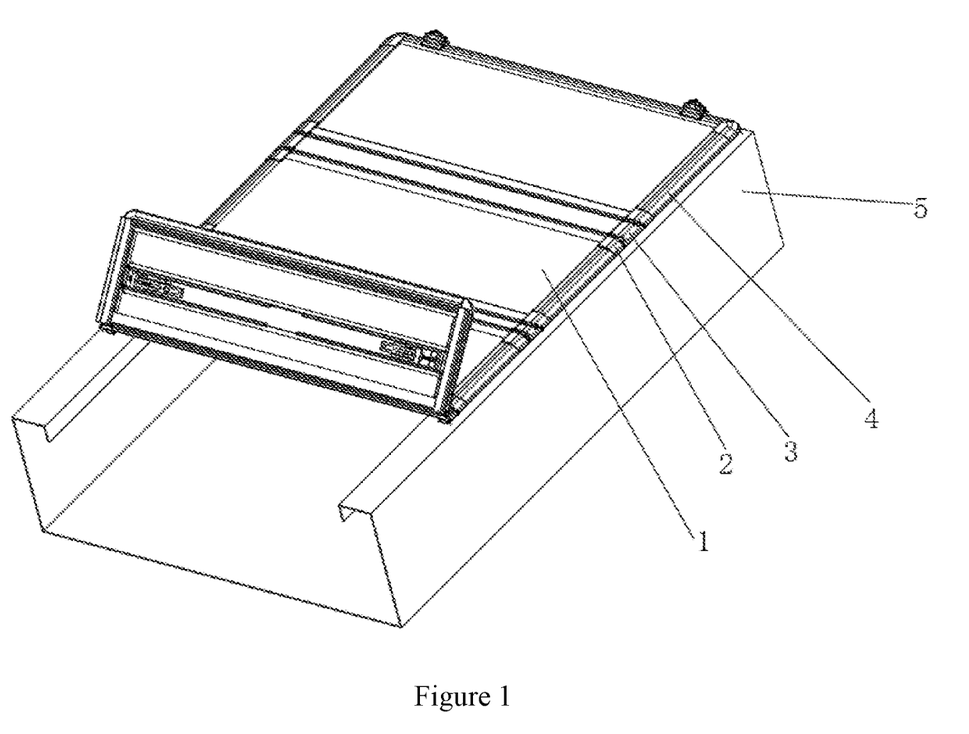
FIG. 1 is a partial structure illustration of the invention.
Figure 2:
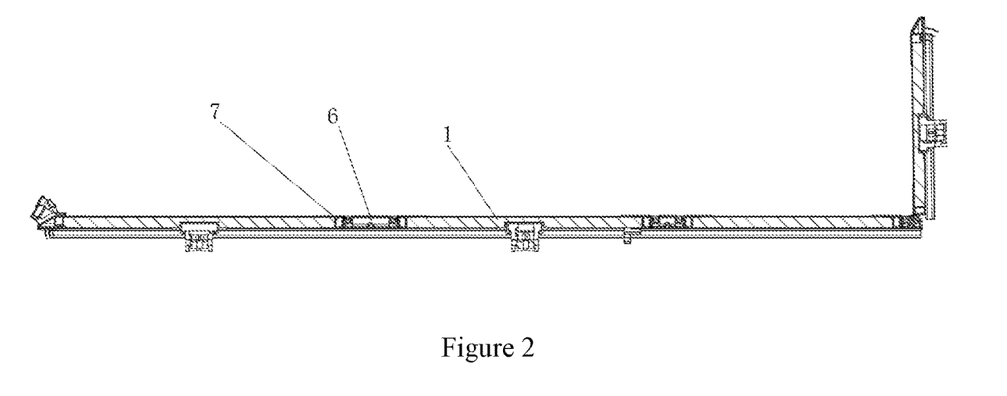
FIG. 2 is a partial structural cross section illustration of bed cover in the invention.
Figure 3:
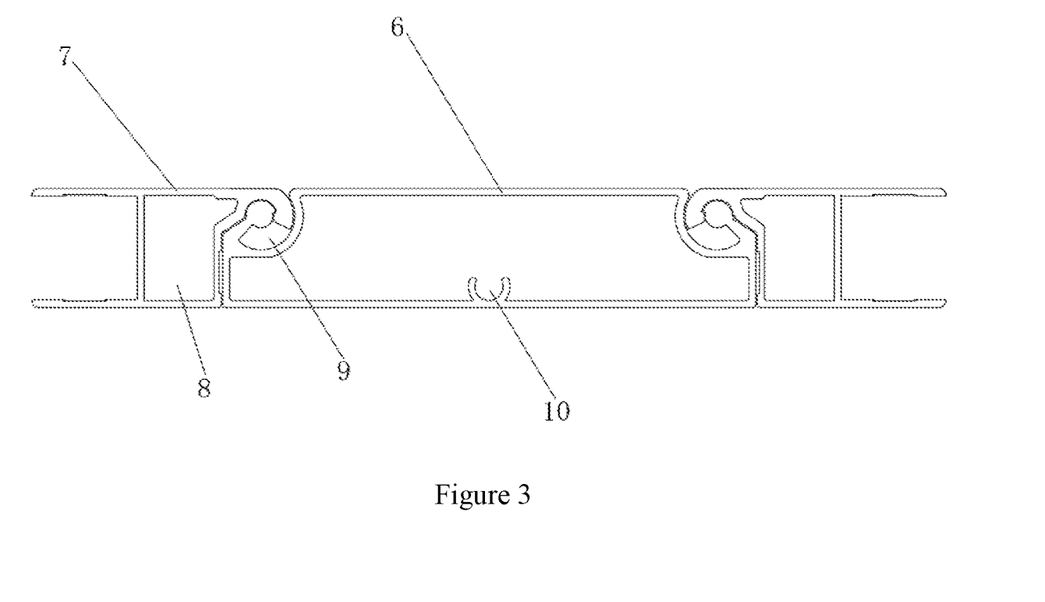
FIG. 3 is a partial structural cross section illustration of the rotating shaft structure in the invention.
Figure 4:
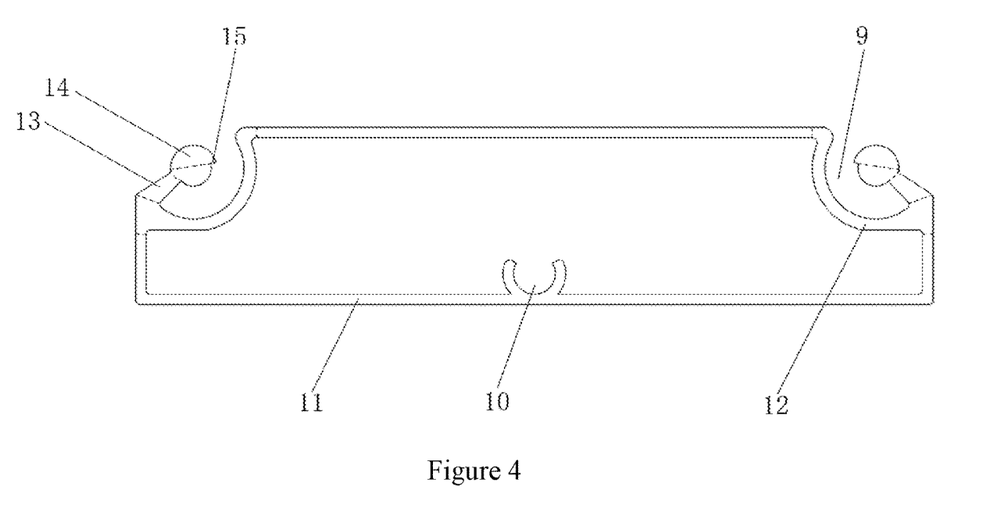
FIG. 4 is a partial structural cross section illustration of the pedestal in the invention.
Figure 5:
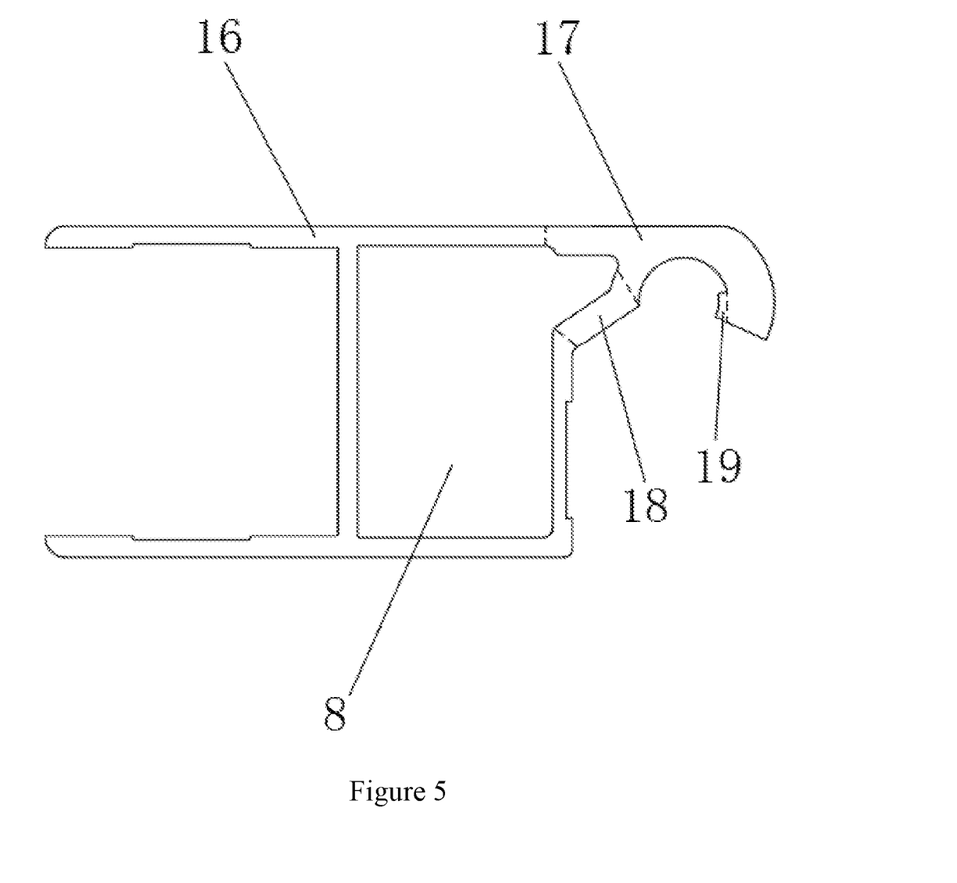
FIG. 5 is a partial structural cross section illustration of the rotating rod in the invention.

The rotating part is provided with a connecting plate 13 which is obliquely arranged. One side of the connecting plate is connected with the rotating part, and the other side of the connecting plate is connected with the straight rod; One side of the fixed part is provided with a reinforcing plate 18 which is obliquely arranged. One side of the reinforcing plate is connected with the fixed part, and the other side of the plate is connected with the rotating shaft part. The straight rod and the rotating part are connected by a connecting plate which is obliquely arranged. Thus a reinforcing plate with the same inclination as the connecting plate is arranged to make room for the rotary rod. The connection between the fixed part and the rotating shaft part is firmer, and the structural strength is strengthened, which is conducive to bearing the pressure on the rotating rod caused by the folding of the plate body. A ladder-like hook is formed on one side of the connection part between the upper part and the lower part of the straight rod for matching with the strip convex. The other side of the connection between the upper part and the lower part of the straight rod is connected with the connecting plate, thus ensuring the structural stability.

Figure 6:
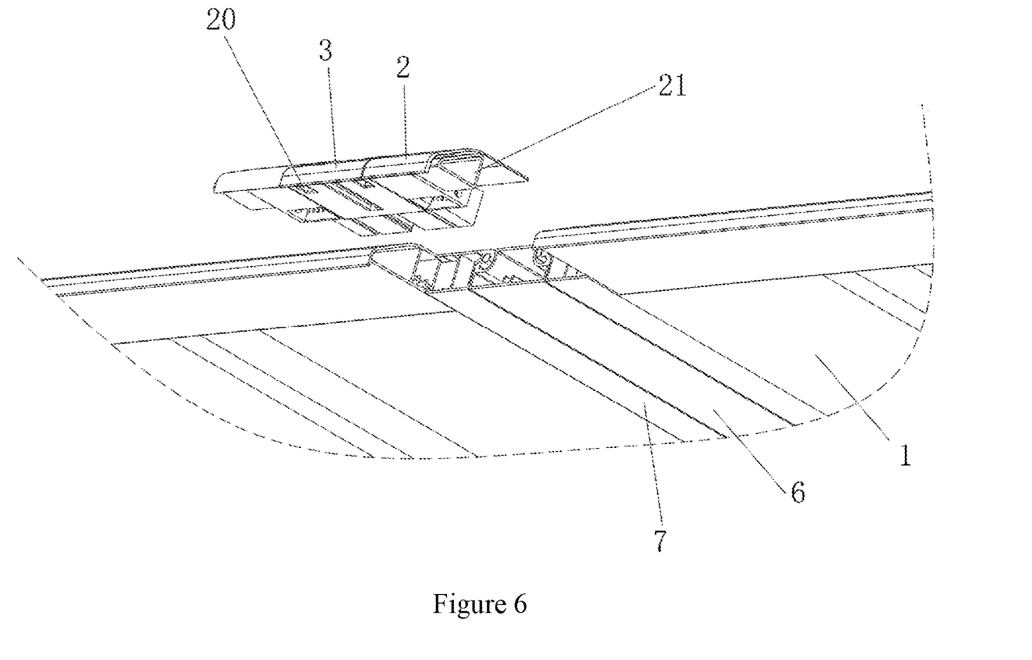
FIG. 6 is a partial structural bottom view of the side component in the invention.
Figure 7:
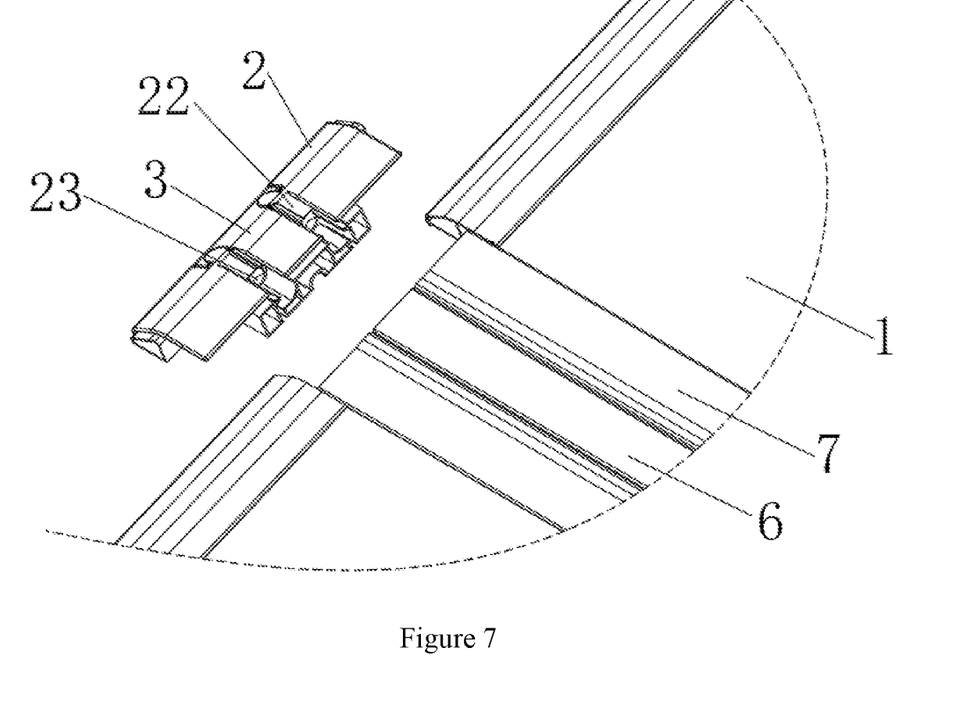
FIG. 7 is a partial structural vertical view of the side component in is the invention.

The bed cover includes a side component which includes a sidebar 4, an intermediate rod socket and a shaft socket 3 The side bar is arranged on the outside of the plate and covers the side of the plate; the rotating shaft socket covers the side of the base, and the intermediate rod joint covers the side of the fixed part; The intermediate rod socket is provided with a convex part 22 and the lower surface of the convex part is an arc shape. The rotating shaft socket is provided with a groove part 23 for inserting the convex part, and the groove is formed between the convex part and the groove part. The rotary groove is connected with the groove. A water outlet 20 is arranged at the bottom of the groove. The lower surface of the convex part is arc-shaped, the bottom surface of the groove part is arc-shaped. The convex part and groove part can rotate relatively, and the gap between the convex part and the groove part forms a groove. Then the rotating groove is connected with the groove to form a drainage channel. When the water enters the drainage channel, the water infiltrating the rotating shaft structure flows out through the opening. The water outlet is set at the bottom of the groove to form a hidden water outlet, which ensures the overall aesthetics of the box cover of pickup truck, and the water outlet faces down to ensure the drainage effect.

In order to fix the intermediate rod socket, the fixed part is provided with a first embedded slot 8, the side bar is provided with a second embedded slot. The intermediate rod socket is provided with a first clamping part and a second clamping part 21. The first clamping part is inserted into the first embedded slot, and the second clamping part is inserted into the second embedded slot; the intermediate rod socket and the side bar are both provided with a first bolt hole. Then, through the first bolt hole, the intermediate rod socket is further fixed with the side bar.

In order to fix the rotating shaft socket, the base is provided with a third embedded slot, the rotating shaft socket is provided with a third clamping part and is the third clamping part is inserted into the third embedded slot; a second bolt hole 10 is arranged on the rotating shaft socket and the base. Then through the second bolt hole, the rotating shaft socket is further fixed with the base.

Figure 8:
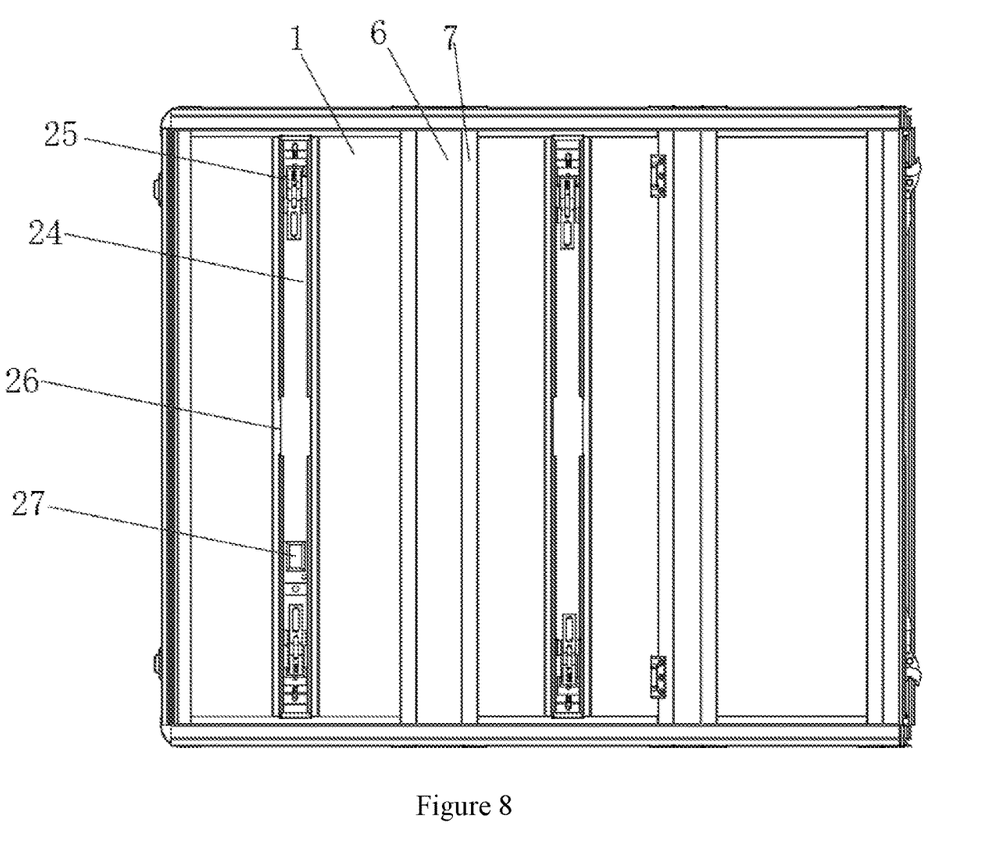
FIG. 8 is a partial structure bottom view of the bed cover in the invention.

The lower part of the plate body is provided with a long strip-shaped straight slot 24. A locking device 25 for fixing the cargo box cover to the pickup truck body 5 is arranged on the inner sides of the straight slot. The middle part of the straight slot is provided with an opening, which can be used as a maintenance opening 26 for user to fix the locking device. The locking device can be wrench, bolt, lock and other parts. When the locking device adopts a wrench, pull down the handle at the back of the wrench so that the clamp at the front of the wrench will stuck on the side wall of the pickup truck body, and the wrench will be fixed to the straight slot through the fixing block. When the plate body on the bed cover is folded, the fixing block can also buffer the wrench.

The straight slot is provided with a lighting module 27. One side of the lighting module is provided with a first push-button switch for controlling the opening and closing of the lighting module. The upper part of the plate is provided with a second push-button switch for controlling the opening and closing of the lighting module. The lighting module includes a accumulator, which is connected with a solar panel arranged on the top of the plate, making it convenient for users to observe the goods in the bed cover. When the bed cover cannot be folded and opened, it is also convenient for the user to maintain the cover.

In this design, the base and the rotating rod are matched to rotate. The is base is provided with a rotating part and the rotating rod is provided with a rotating shaft part matched with the rotating part; Similarly, a rotating part is arranged on the rotating rod, and a rotating shaft part matched with the rotating part is arranged on the pedestal. That is to say, a steady bed cover of pickup truck includes one bed cover, wherein said the bed cover includes at least two plates. The adjacent plates are connected by rotating shaft structure; the rotating shaft structure includes a pedestal, two rotating rods which are respectively arranged on two sides of the pedestal; the rotating rod comprises a fixed part which is fixedly connected with the plate. There is a rotary groove whose cross section is major arc shape on the rotating part. The straight rod arranged transversely is arranged above the rotary groove. The straight rod includes the upper part and the lower part. The cross sections of the upper part and the lower part are semi-circular. The radius of the upper part is larger than that the lower part, thus a ladder-like hook is formed on one side of the straight rod close to the fixed part; the pedestal includes a base and there is a hook-like rotating shaft part on both sides of the base. The rotating shaft part is inserted into the rotary groove and the front side of the rotating shaft part is provided with a strip convex for clamping the ladder-like hook. Accordingly, in order to ensure the function of the bed cover, the straight rod is solid. The upper part and the lower part of the straight rod adopt an integrated structure. The rotating part is provided with a connecting plate which is obliquely arranged. One side of the connecting plate is connected with the rotating part, and the other side of the connecting plate is connected with the straight rod; One side is of the base is provided with a reinforcing plate arranged obliquely, and one side of the reinforcing plate is connected with the base. The other side of the reinforcing plate is connected with the rotating shaft part.

Finally, it should be noted that the above is only a preferred embodiment of the invention and is not used to limit the invention. Although the invention is described in detail with reference to the above embodiment, it is still possible for those skilled in the field to modify. Or they can do equivalent replacement of some of the technical features in it. Any modification, equivalent replacement, improvement etc. made within the spirit and principles of the invention shall be included in the scope of protection of the invention.

We claim:

1. A steady bed cover of pickup truck includes one bed cover, wherein said bed cover includes at least two plates, adjacent plates are connected by rotating shaft structure;
   the rotating shaft structure includes a pedestal, two rotating rods which are respectively arranged on two sides of the pedestal;
   the pedestal includes a base and there is a rotating part on both sides of the base; there is a rotary groove whose cross section is major arc shape on the rotary part; a straight rod arranged transversely above the rotary groove; the straight rod includes a upper part and a lower part; cross sections of the upper part and the lower part are semi-circular; a radius of the upper part is larger than a radius of the lower part, thus a ladder-like hook is formed on one side of the straight rod close to the base;
   the rotating rod comprises a fixed part which is fixedly connected with one of the plates; one side of the fixed part is provided with a hook-like rotating shaft part; the rotating shaft part is inserted into the rotary groove and a front side of the rotating shaft part is provided with a convex strip for clamping the ladder-like hook.

2. The steady bed cover of pickup truck according to claim 1, wherein the straight rod is solid; the upper part and the lower part of the straight rod adopt an integrated structure.

3. The steady bed cover of pickup truck according to claim 1, wherein there is a connecting plate arranged obliquely on one side of the rotating part; one side of the connecting plate is connected with the rotating part, and the other side of the connecting plate is connected with the straight rod;
   one side of the fixed part is provided with a reinforcing plate which is obliquely arranged; one side of the reinforcing plate is connected with the fixed part, and the other side of the plate is connected with the rotating shaft part.

4. The steady bed cover of pickup truck according to claim 1, wherein the bed cover includes a side component which includes a sidebar, an intermediate rod socket and a shaft socket; the side bar is arranged on the outside of the plate and covers the side of the plate;

the rotating shaft socket covers the side of the base, and the intermediate rod socket covers the side of the fixed part;

the intermediate rod socket is provided with a convex part, and a lower surface of the convex part is an arc shape; the rotating shaft socket is provided with a groove part for inserting the convex part, and the groove is formed between the convex part and the groove part; the rotary groove is connected with the groove.

5. The steady bed cover of pickup truck according to claim 4, wherein a water outlet is arranged at the bottom of the groove.

6. The steady bed cover of pickup truck according to claim 4, wherein the fixed part is provided with a first embedded slot, the side bar is provided with a second embedded slot; the intermediate rod socket is provided with a first clamping part and a second clamping part; the first clamping part is inserted into the first embedded slot, and the second clamping part is inserted into the second embedded slot;

the intermediate rod socket and the side bar are both provided with a first bolt hole.

7. The steady bed cover of pickup truck according to claim 4, wherein the base is provided with a third embedded slot, the rotating shaft socket is provided with a third clamping part and the third clamping part is inserted into the third embedded slot;

a second bolt hole is arranged on the rotating shaft socket and the base.

8. The steady bed cover of pickup truck according to claim 1, wherein a lower part of the plate body is provided with a long strip-shaped straight slot; a locking device for fixing the cargo box cover to the pickup truck body is arranged on the inner sides of the straight slot; the middle part of the straight slot is provided with an opening, which can be used as a maintenance opening.

9. The steady bed cover of pickup truck according to claim 8, wherein the straight slot is provided with a lighting module.

10. A steady bed cover of pickup truck includes one bed cover, wherein said bed cover includes at least two plates; adjacent plates are connected by rotating shaft structure;

the rotating shaft structure includes a pedestal, two rotating rods which are respectively arranged on two sides of the pedestal;

each rotating rod comprises a fixed part which is fixedly connected with the plate; there is a rotary groove whose cross section is major arc shape on the rotating part; a straight rod arranged transversely is arranged above the rotary groove; the straight rod includes a upper part and a lower part; cross sections of the upper part and the lower part are semi-circular; a radius of the upper part is larger than a radius of the lower part, thus a ladder-like hook is formed on one side of the straight rod close to the fixed part;

the pedestal includes a base and there is a hook-like rotating shaft part on both sides of the base; the rotating shaft part is inserted into the rotary groove and the front side of the rotating shaft part is provided with a convex strip for clamping the ladder-like hook.

\* \* \* \* \*